Patented Oct. 27, 1925.

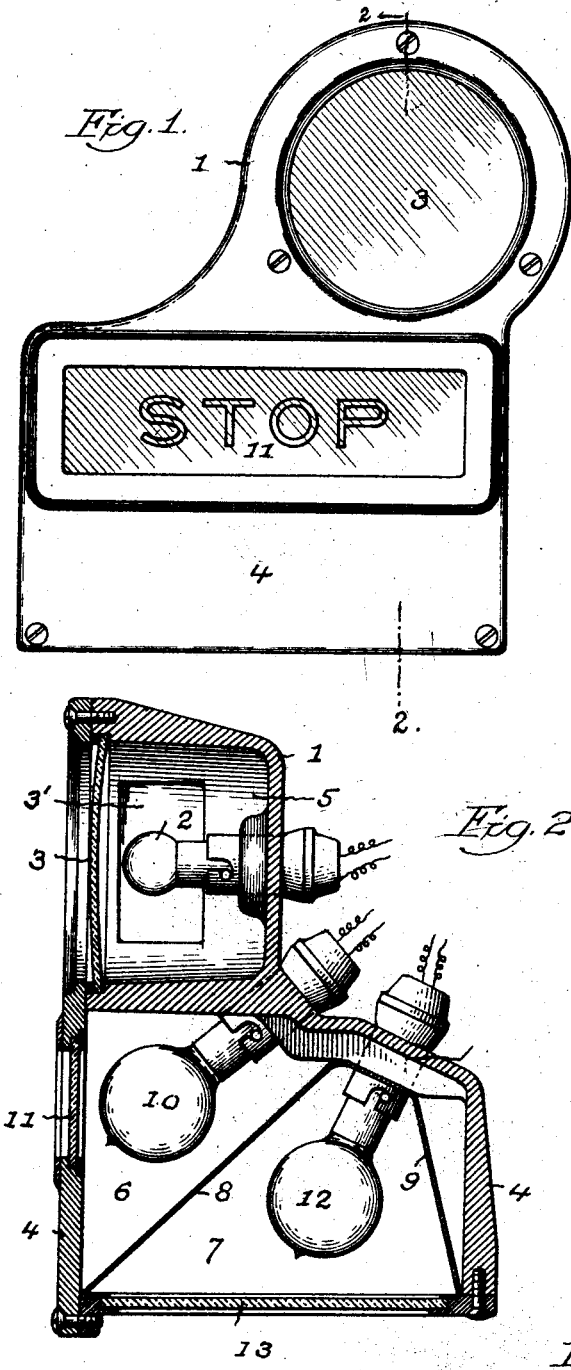

1,559,249

UNITED STATES PATENT OFFICE.

WENDELL WOODS HALL, OF CHICAGO, ILLINOIS.

REAR SIGNAL LIGHT FOR MOTOR VEHICLES.

Application filed July 2, 1925. Serial No. 40,990.

*To all whom it may concern:*

Be it known that I, WENDELL WOODS HALL, a citizen of the United States of America, and a resident of Chicago, in the county of Cook and State of Illinois, have invented a certain new and useful Improvement in Rear Signal Lights for Motor Vehicles, of which the following is a specification.

This invention relates to that class of tail lights for automobiles and like motor vehicles in which are combined the rear signal light, a license plate light, a stop signal light and a protection signal light adapted to illuminate roadway at the rear portion of the vehicle, and the present improvement has for its object:

To provide a structural formation and combination of parts and features, providing a small and compact arrangement of the elements of the appliance, and with which a maximum degree of illumination of the roadway and of the rear parts of the vehicle is attained so that the operator of a vehicle approaching in an opposite direction will have ample information and protection in effecting a safe passage, as well as impart to the operator of a vehicle overtaking from the rear, ample information and protection in effecting a passage and thus serve to give like information and protection to the various operators, all as will hereinafter more fully appear.

In the accompanying drawing:

Fig. 1, is a rear elevation of the appliance.

Fig. 2, is a vertical section of the same, on line 2.—2. Fig. 1.

Like reference numerals indicate like parts in the different views.

As shown in the drawing the enclosing housing or shell of the appliance is perferably of an approximately L shape, longitudinally and transversely, with the upper and smaller shell portion 1 formed to receive and hold the tail light lamp 2, and in connection therewith the rear side of the shell portion 1 is formed with an opening in which is arranged the usual lens 3 of a red or other color.

In the preferred construction a side wall of the upper chamber 5 is formed with a glazed opening 3″ through which the license plate of the vehicle received illumination from the lamp 2 aforesaid.

The lower and larger shell portion 4 is separated from the upper shell portion 1 by a horizontal partition 1 and is in turn divided into upper and lower sub-chambers 6 and 7 by an inclined partition 8, usually a portion of the reflector lining 9 of the lower sub-chamber 7, as illustrated in Fig. 2.

The upper sub-chamber 6 is formed for the reception of a stop light lamp 10, and in connection therewith the rear side of the lower shell portion 4 is provided with an opening having a transparent closure 11 bearing the stop legend.

The lower sub-chamber 7 is similarly formed for the reception of a ground light lamp 12 and in conjunction therewith the bottom wall of the lower shell portion 4, and of such sub-chamber is formed with an opening co-extensive with the horizontal area of said shell portion 4 and the sub-chamber 7, with said opening glazed by a transparent closure 13 to prevent entry of dust, etc.

With the described formation and arrangement of the lower sub-chamber 7, the same has a downwardly flaring form adapted to give a downward flood of light upon the roadway, and co-extensive as to not only light up the roadway adjacent to the rear portion of the vehicle, and to illuminate the rear wheels and adjacent parts of the vehicle and render said parts plainly visible, without blinding, to the driver of a vehicle approaching in an opposite direction, either in passing or in overtaking, thereby giving the operator of the equipped vehicle ample protection both ways and give the other two operators ample safety in passage.

As usual in the present class of rear light signals, the rear signal lamp 2 will be wired and connected in the usual way so as to light at all times during darkness, the stop signal lamp 10 is wired and connected in the usual way, so that it will be only lit up when the brake is used, while the protection signal lamp 12 is wired and connected with a switch on the dash board so that it can be turned on or off at the discretion of the operator. The lamps 10 and 12 will be usually of a like size and candle power and be of a larger size and greater candle power than the lamp 2 aforesaid.

The present appliance is intended to be located on the left hand side of the rear end of the vehicle, and attached to a carrying bracket on the vehicle frame by which it is hung above and about the mid-width of the left rear fender and at the proper height above the roadway.

Having thus fully described my invention, what I claim and desire to secure by Letters Patent, is:—

1. In a rear signal device for motor vehicles, an enclosing shell the lower portion of which is divided into an upper and a lower sub-chamber by an inclined partition extending the transverse width of said shell portion, the upper sub-chamber having an opening in its rear wall and a signal lamp in its interior, the lower sub-chamber having an opening in its bottom wall co-extensive with the area of said sub-chamber and a signal lamp in its interior.

2. In a rear signal device for motor vehicles, an enclosing shell the lower portion of which is divided into an upper and a lower sub-chamber by an inclined partition extending the transverse width of said shell portion and forming a portion of a reflector in said lower sub-chamber, the upper sub-chamber having an opening in its rear wall and a signal lamp in its interior, the lower sub-chamber having an opening in its bottom wall co-extensive with the area of the sub-chamber and a signal lamp in its interior.

3. In a rear signal device for motor vehicles, an enclosing shell of an approximately L shape longitudinally and transversely, the upper and smaller portion carrying a rear light signal element, with the lower and larger portion divided into an upper and lower sub-chamber by an inclined partition extending the transverse width of said shell portion, the upper sub-chamber having an opening in its rear wall and a signal lamp in its interior, the lower sub-chamber having an opening in its bottom wall co-extensive with the area of said sub-chamber and a signal lamp in its interior.

4. In a rear signal device for motor vehicles, an enclosing shell of an approximately L shape longitudinally and transversely, the upper and smaller portion carrying a rear light signal element, with the lower and larger portion divided into an upper and lower sub-chamber by an inclined partition extending the transverse width of said shell portion and forming a portion of a reflector in said lower sub-chamber, the upper sub-chamber having an opening in its rear wall and a signal lamp in its interior, the lower sub-chamber having an opening in its bottom wall co-extensive with the area of the sub-chamber and a signal lamp in its interior.

Signed at New York city, this 24th day of June 1925.

WENDELL WOODS HALL.